United States Patent
Han

(10) Patent No.: US 10,850,960 B2
(45) Date of Patent: Dec. 1, 2020

(54) COOLING DEVICE FOR FORKLIFT BRAKE SYSTEM

(71) Applicant: DOOSAN CORPORATION, Seoul (KR)

(72) Inventor: Dong Ho Han, Seoul (KR)

(73) Assignee: DOOSAN CORPORATION

( * ) Notice: Subject to any disclaimer, the term of this patent is extended or adjusted under 35 U.S.C. 154(b) by 320 days.

(21) Appl. No.: 16/060,041

(22) PCT Filed: Dec. 8, 2015

(86) PCT No.: PCT/KR2015/013390
§ 371 (c)(1),
(2) Date: Oct. 4, 2018

(87) PCT Pub. No.: WO2017/099267
PCT Pub. Date: Jun. 15, 2017

(65) Prior Publication Data
US 2020/0165112 A1 May 28, 2020

(51) Int. Cl.
*B66F 9/075* (2006.01)
*B66F 17/00* (2006.01)
(Continued)

(52) U.S. Cl.
CPC ...... *B66F 9/07595* (2013.01); *B66F 9/07509* (2013.01); *B66F 17/003* (2013.01);
(Continued)

(58) Field of Classification Search
CPC .............. F15B 21/0423; F15B 2211/62; B66F 9/07595; B66F 17/003
See application file for complete search history.

(56) References Cited

U.S. PATENT DOCUMENTS

| 6,029,445 A * | 2/2000 | Lech | E02F 9/2203 |
|  |  |  | 60/422 |
| 7,225,764 B2 * | 6/2007 | Odeskog | F01P 7/167 |
|  |  |  | 123/41.01 |

(Continued)

FOREIGN PATENT DOCUMENTS

| CN | 201580374 U | * | 9/2010 |
| CN | 201580374 U |  | 9/2010 |

(Continued)

OTHER PUBLICATIONS

Search Report issued in European Patent Application No. 15910293.8 dated Nov. 6, 2018, consisting of 7 pp.

(Continued)

*Primary Examiner* — Thomas E Lazo
(74) *Attorney, Agent, or Firm* — Volpe Koenig

(57) ABSTRACT

The present invention is related to a cooling device for a forklift brake system, which is capable of maintaining a predetermined level of heat-radiation performance by reducing heat when heat is generated in a service brake that is provided at a forklift driving shaft. A cooling device for a forklift brake system according to an exemplary embodiment of the present invention allows cooling oil to bypass a cooler when a pressure of the cooling oil is abnormally increased or there is a concern that a pressure of the cooling oil is increased, thereby preventing the cooler from being damaged.

8 Claims, 4 Drawing Sheets

(51) Int. Cl.
*F01P 7/16* (2006.01)
*F01P 3/00* (2006.01)
*F01P 7/14* (2006.01)

(52) U.S. Cl.
CPC ......... *F01P 7/161* (2013.01); *F01P 2003/006* (2013.01); *F01P 2007/146* (2013.01)

(56) References Cited

U.S. PATENT DOCUMENTS

| | | | | |
|---|---|---|---|---|
| 7,992,385 | B2* | 8/2011 | Shimizu | F16D 25/123 |
| | | | | 60/337 |
| 8,224,517 | B2* | 7/2012 | Eser | F01P 5/14 |
| | | | | 123/41.01 |
| 2009/0236435 | A1* | 9/2009 | Kudo | F01P 11/20 |
| | | | | 237/12.3 B |

FOREIGN PATENT DOCUMENTS

| | | |
|---|---|---|
| DE | 102008032130 A1 | 1/2010 |
| DE | 102010010594 A1 | 9/2011 |
| JP | 1982-110549 A | 7/1982 |
| JP | 1993-000661 A | 1/1993 |
| JP | 06-023874 U | 3/1994 |
| JP | H0623874 U | 3/1994 |
| JP | 2001-012402 A | 1/2001 |
| JP | 2005-054941 A | 3/2005 |
| JP | 2010-159821 A | 7/2010 |
| JP | 2011-038615 A | 2/2011 |
| JP | 2013-002560 A | 1/2013 |
| JP | 2013-124693 A | 6/2013 |
| JP | 2013-132999 A | 7/2013 |
| KR | 10-1998-0010004 | 4/1998 |
| KR | 10-1998-0059413 | 10/1998 |
| KR | 1020070053017 A | 5/2007 |
| KR | 10-0790049 B1 | 1/2008 |
| KR | 10-2016-0050803 A | 5/2016 |
| WO | 97/33078 A1 | 9/1997 |
| WO | 99/56032 A1 | 11/1999 |
| WO | 2014/098709 A1 | 6/2014 |

OTHER PUBLICATIONS

International Search Report issued in corresponding International Patent Appln. No. PCT/KR2015/013390 dated Sep. 30, 2016, consisting of 5 pp. (English Translation Provided).

Written Opinion issued in corresponding International Patent Appln. No. PCT/KR2015/013390 dated Sep. 30, 2016, consisting of 7 pp.

Office Action issued in Japanese Patent Application No. 2018-529562 dated Sep. 10, 2019, consisting of 3 pp.

* cited by examiner

*Prior Art*

COOLING DEVICE FOR FORKLIFT BRAKE SYSTEM

TECHNICAL FIELD

The present invention relates to a cooling device for a forklift brake system, and more particularly, to a cooling device for a forklift brake system, which is capable of maintaining a predetermined level of heat-radiation performance by reducing heat when heat is generated in a service brake that is provided at a forklift driving shaft.

BACKGROUND ART

In general, a service brake is provided at a driving shaft of a forklift. Heat is generated during an operation of the service brake. Heating increases a temperature of cooling oil, and in order to prevent the cooling oil from being overheated, a cooling device for a brake system is used.

A cooling device for a forklift brake system known in the art will be described with reference to FIG. 1. FIG. 1 is a hydraulic circuit diagram for describing a cooling device for a forklift brake system in the related art.

The cooling device for the forklift brake system in the related art includes a hydraulic pump 1, an oil tank 2, a cooler 3, and a service brake 4.

The hydraulic pump 1 and the cooler 3 are connected through a first hydraulic line L1. The cooler 3 and the service brake 4 are connected through a second hydraulic line L2. Further, the service brake 4 and the oil tank 2 are connected through a third hydraulic line L3.

In the meantime, a bypass line L4 is connected so as to connect a front end and a rear end of the cooler 3, and a check valve 5 is provided at the bypass line L4.

The hydraulic pump 1 sucks cooling oil from the oil tank 2 and discharges the cooling oil toward the cooler 3. The cooler 3 cools the introduced cooling oil. Further, the cooling oil passing through the cooler 3 is provided to the service brake 4 in a cooled state to cool the service brake 4. The cooling oil passing through the service brake 4 is returned to the oil tank 2.

In the meantime, when a problem is generated in the cooler 3 and cooling oil fails to smoothly pass through the cooler 3, a pressure at the front end of the cooler 3 is increased and the increased pressure opens the check valve 5 provided at the bypass line L4. Then, the cooling oil bypasses the cooler 3 and is provided to the service brake 4.

However, the cooling device for the forklift brake system in the related art, which is configured and operated as described above, has the problems described below.

When an atmospheric temperature is decreased, viscosity of the cooling oil is increased. Particularly, viscosity of the cooling oil is further increased in winter season. In this case, an abnormal pressure higher than a normal pressure, which is allowed by the cooler 3, may be formed in the first hydraulic line L1.

Further, as a forklift is larger, a longer second hydraulic line L2 connected between the cooler 3 and the service brake 4 is disposed. As described above, as the second hydraulic line L2 is longer, the cooling oil demands a higher pressure.

Further, the pressure of the cooling oil is lost while passing through the cooler 3 or the service brake 4, so that a higher pressure is required for compensating for the loss.

When an abnormal pressure or a higher pressure is formed at the front end of the cooler 3 due to the various reasons as described above, an allowable pressure of the cooler 3 may be exceeded, and in this case, there is a problem in that the cooler 3 is damaged.

On the other hand, the check valve 5 is provided in the cooling device for the forklift brake system in the related art, but there is a case where the check valve 5 is not normally operated, and in a situation where the check valve 5 cannot be opened, there is a problem in that the cooler 3 is severely damaged.

For example, when an opening pressure is set in the check valve 5 and a situation is a general situation, the check valve 5 may be opened when the corresponding opening pressure is formed to bypass the cooling oil. However, when a temperature is rapidly decreased and atmospheric temperature is very low, viscosity of the cooling oil may be abnormally excessively high, and in this case, the check valve 5 may not be normally operated.

RELATED ART LITERATURE (Patent Document 1) Korean Patent Application Laid-Open No. 10-1998-0010004 (published on Apr. 30, 1998)

(Patent Document 2) Korean Patent Application Laid-Open No. 10-1998-0059413 (published on Oct. 7, 1998)

DISCLOSURE

Technical Problem

Accordingly, a technical object to be achieved by the present invention is to provide a cooling device for a forklift brake system, which allows cooling oil to bypass a cooler when a pressure of the cooling oil is abnormally increased or there is a concern that a pressure of the cooling oil is increased, thereby preventing the cooler from being damaged.

The technical object aimed to be achieved by the present invention is not limited to the foregoing technical object, and other non-mentioned technical objects may be clearly understood by those skilled in the art from the description below.

Technical Solution

In order to achieve the technical object, a cooling device for a forklift brake system according to an exemplary embodiment of the present invention includes: an oil tank 12 in which cooling oil is stored; a hydraulic pump 11 which sucks and discharges the cooling oil; a cooler 13 which cools the discharged cooling oil; a service brake 14 which is cooled by the cooled cooling oil and allows the used cooling oil to be returned to the oil tank 12; a first bypass line L14 which connects a front end of the service brake 14 and a rear end of the service brake 14; and a check valve 15 which is installed on the first bypass line L14, and is opened when an abnormal pressure is generated at the front end of the service brake 14 and allows the cooled cooling oil to bypass the service brake 14.

Further, the cooling device for the forklift brake system according to the exemplary embodiment of the present invention may further include: a second bypass line L15 which is connected from a front end of the cooler 13 to the oil tank 12; and a relief valve 16 which is installed on the second bypass line L15 and is set with a pressure allowable by the cooler 13.

Further, the cooling device for the forklift brake system according to the exemplary embodiment of the present invention may further include: a third bypass line L16 which connects a front end of the cooler 13 and a rear end of the cooler 13; and a thermostat valve 17 which is installed on the third bypass line L16, and is maintained in a closed state when a temperature of the cooling oil discharged from the hydraulic pump 12 is higher than a setting temperature and is opened when the temperature of the cooling oil discharged from the hydraulic pump 12 is lower than the setting temperature to allow the cooling oil to bypass the cooler 13.

Further, the cooling device for the forklift brake system according to the exemplary embodiment of the present invention may further include: a temperature sensor 18 which detects a temperature of the cooling oil at a front end of the thermostat valve 17; and a controller 20 which receives the temperature value of the cooling oil detected by the temperature sensor 18, and controls a dashboard 21 to display an abnormal temperature when the received temperature value deviates from an allowable temperature range.

Further, the cooling device for the forklift brake system according to the exemplary embodiment of the present invention may further include: a temperature sensor 18 which detects a temperature of the cooling oil at a front end of the thermostat valve 17; and a controller 20 which receives the temperature value of the cooling oil detected by the temperature sensor 18, and controls a buzzer 22 to output a warning sound when the received temperature value deviates from an allowable temperature range.

Further, the cooling device for the forklift brake system according to the exemplary embodiment of the present invention may further include: a temperature sensor 18 which detects a temperature of the cooling oil at a front end of the thermostat valve 17; and a controller 20 which receives the temperature value of the cooling oil detected by the temperature sensor 18, and controls a transmission controller 23 to decrease a speed of a vehicle when the received temperature value deviates from an allowable temperature range.

Further, the cooling device for the forklift brake system according to the exemplary embodiment of the present invention may further include: a third bypass line L16 which connects a front end of the cooler 13 and a rear end of the cooler 13; a hydraulic valve 19 which is installed on the third bypass line L16 and is opened and closed; a temperature sensor 18 which detects a temperature of the cooling oil at a front end of the hydraulic valve 19; and a controller 20 which receives the temperature value of the cooling oil detected by the temperature sensor 18, and controls the hydraulic valve 19 to be maintained in a closed state when the temperature value is higher than a setting temperature and controls the hydraulic valve 19 to be opened when the temperature value is lower than the setting temperature.

Further, in the cooling device for the forklift brake system according to the exemplary embodiment of the present invention, when the temperature value of the cooling oil deviates from an allowable temperature range, the controller 20 may control a dashboard 21 to display an abnormal temperature.

Further, in the cooling device for the forklift brake system according to the exemplary embodiment of the present invention, when the temperature value of the cooling oil deviates from an allowable temperature range, the controller 20 may control a buzzer 22 to output a warning sound.

Further, in the cooling device for the forklift brake system according to the exemplary embodiment of the present invention, when the temperature value of the cooling oil deviates from an allowable temperature range, the controller 20 may control the transmission controller 23 to decrease a speed of a vehicle.

Other specific matters of the exemplary embodiment are included in the detailed description and the drawings.

Advantageous Effects

According to the cooling device for the forklift brake system according to the exemplary embodiment of the present invention configured as described above, it is possible to prevent a pressure of cooling oil from being abnormally increased at a front end of a cooler and allow the cooling oil to certainly bypass the cooler when the pressure of the cooling oil is abnormally increased or there is a concern that the pressure of the cooling oil is increased, thereby minimizing damage to the cooler and preventing a life of the cooler from being abnormally decreased.

BEST MODE

Figure 1:
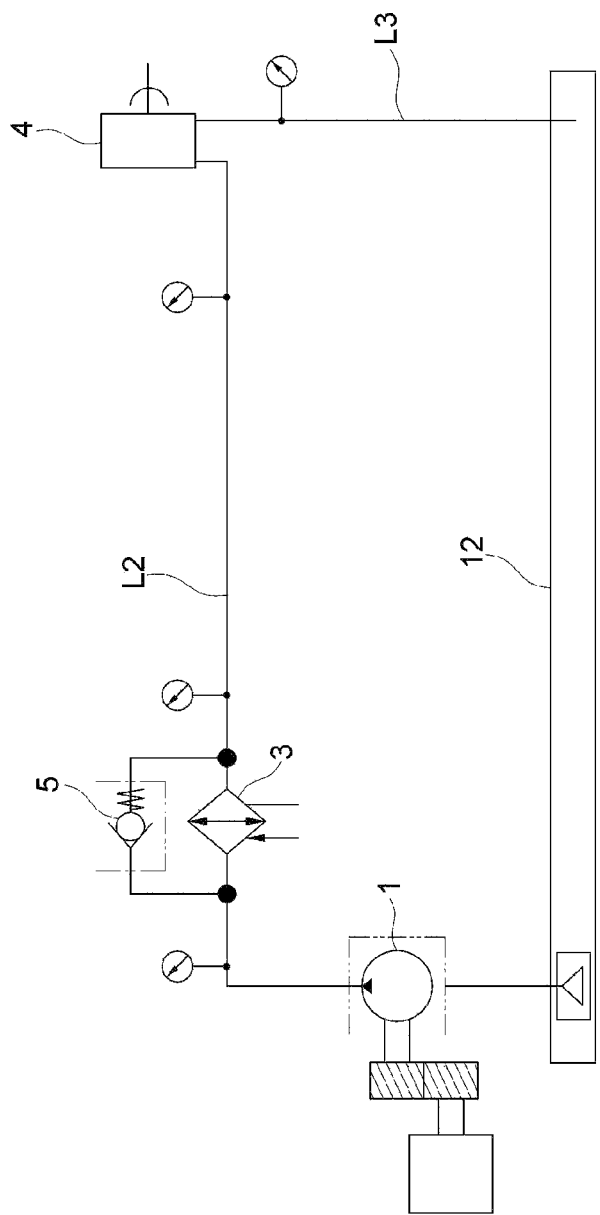
FIG. 1 is a hydraulic circuit diagram for describing a cooling device for a forklift brake system in the related art.

The advantages and characteristics of the present invention, and a method for achieving the advantages and characteristics will become clear by referring to the exemplary embodiment, which is described in detail, together with the accompanying drawings.

Hereinafter, an exemplary embodiment of the present invention will be described in detail with reference to the accompanying drawings. The exemplary embodiment described below is illustrative for helping understanding of the present invention, and it shall be understood that and the present invention may be variously modified and carried out differently from the exemplary embodiment described herein. However, in the description of the present invention, when a detailed description of a related publicly known function or constituent element is determined to unnecessarily make the subject matter of the present invention unclear, the detailed description and a detailed illustration thereof will be omitted. Further, for helping the understanding of the invention, the accompanying drawings are not illustrated according to an actual scale, but sizes of some of the constituent elements may be exaggerated and illustrated.

In the meantime, terms described below are terms set in consideration of a function in the present invention, and may be changed according to an intention of a producer or a usual practice, so that the definitions thereof should be made based on the entire contents of the present specification.

Throughout the specification, the same reference numeral denotes the same constituent element.

First Exemplary Embodiment

Figure 2:
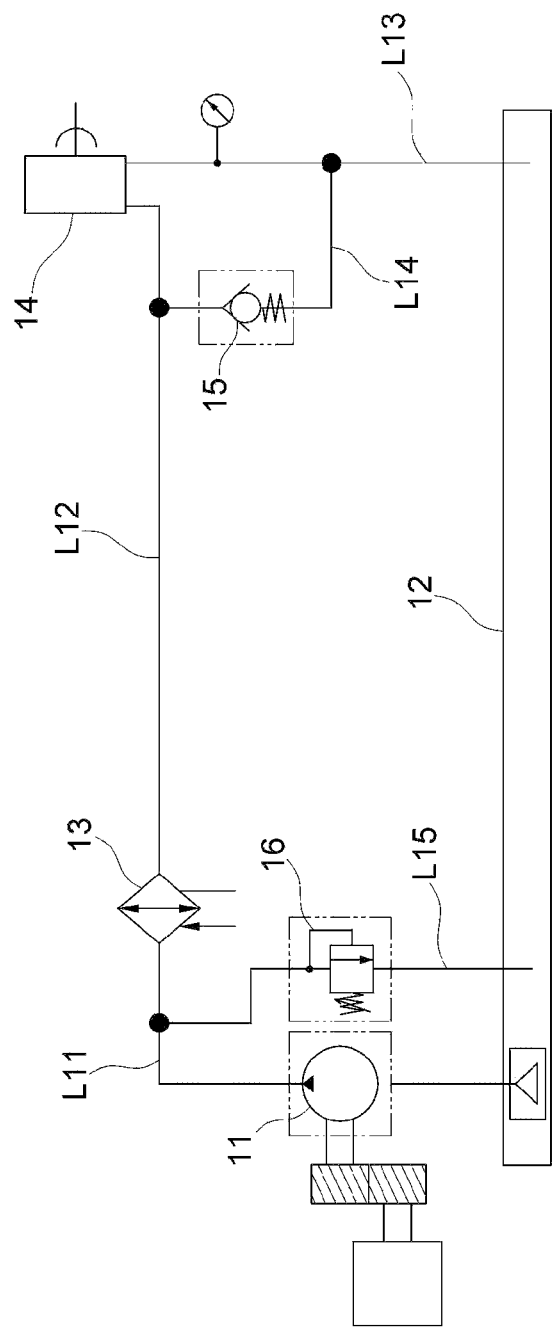
FIG. 2 is a hydraulic circuit diagram for describing a cooling device for a forklift brake system according to an exemplary embodiment of the present invention.

Hereinafter, a cooling device for a forklift brake system according to an exemplary embodiment of the present invention will be described with reference to FIG. 2. FIG. 2 is a hydraulic circuit diagram for describing a cooling device for a forklift brake system according to an exemplary embodiment of the present invention.

The cooling device for the forklift brake system according to the exemplary embodiment of the present invention includes a hydraulic pump 11, an oil tank 12, a cooler 13, and a service brake 14.

The hydraulic pump 11 and the cooler 13 are connected through a first hydraulic line L11. The cooler 13 and the service brake 14 are connected through a second hydraulic line L12. Further, the service brake 14 and the oil tank 12 are connected through a third hydraulic line L13.

In the meantime, a first bypass line L14 is connected so as to connect a front end and a rear end of the service brake 14, and a check valve 15 is provided at the first bypass line L14.

Particularly, a point, at which the first bypass line L14 is connected with the second hydraulic line L12, is much closer to the service brake 14, than the cooler 13.

Further, the first hydraulic line L1 and the service oil tank 12 are connected through the second bypass line L15 at a front end of the cooler 13. A relief valve 16 is provided at the second bypass line L15. The relief valve 16 may be set with a pressure allowable by the cooler 13.

In the cooling device for the forklift brake system according to the exemplary embodiment of the present invention, when a problem is generated in the service brake 14 side and cooling oil fails to be returned to the oil tank 12, a pressure inside the second hydraulic line L12 may be increased. In this case, the check valve 15 is opened to discharge a part of the cooling oil via the first bypass line L14. Accordingly, it is possible to prevent the pressure inside the second hydraulic line L12 from being abnormally increased, and further, it is possible to prevent the abnormally high pressure from influencing the cooler 13, thereby preventing the cooler 13 from being damaged.

Further, when viscosity of the cooling oil is increased due to an external environmental factor, for example, a low atmospheric temperature, there is a concern that the pressure is increased at the front end of the cooler 13. In this case, it is possible to decrease the pressure of the cooling oil by opening the relief valve 16, and further, it is possible to prevent the abnormally high pressure from influencing the cooler 13, thereby preventing the cooler 13 from being damaged.

Second Exemplary Embodiment

Figure 3:
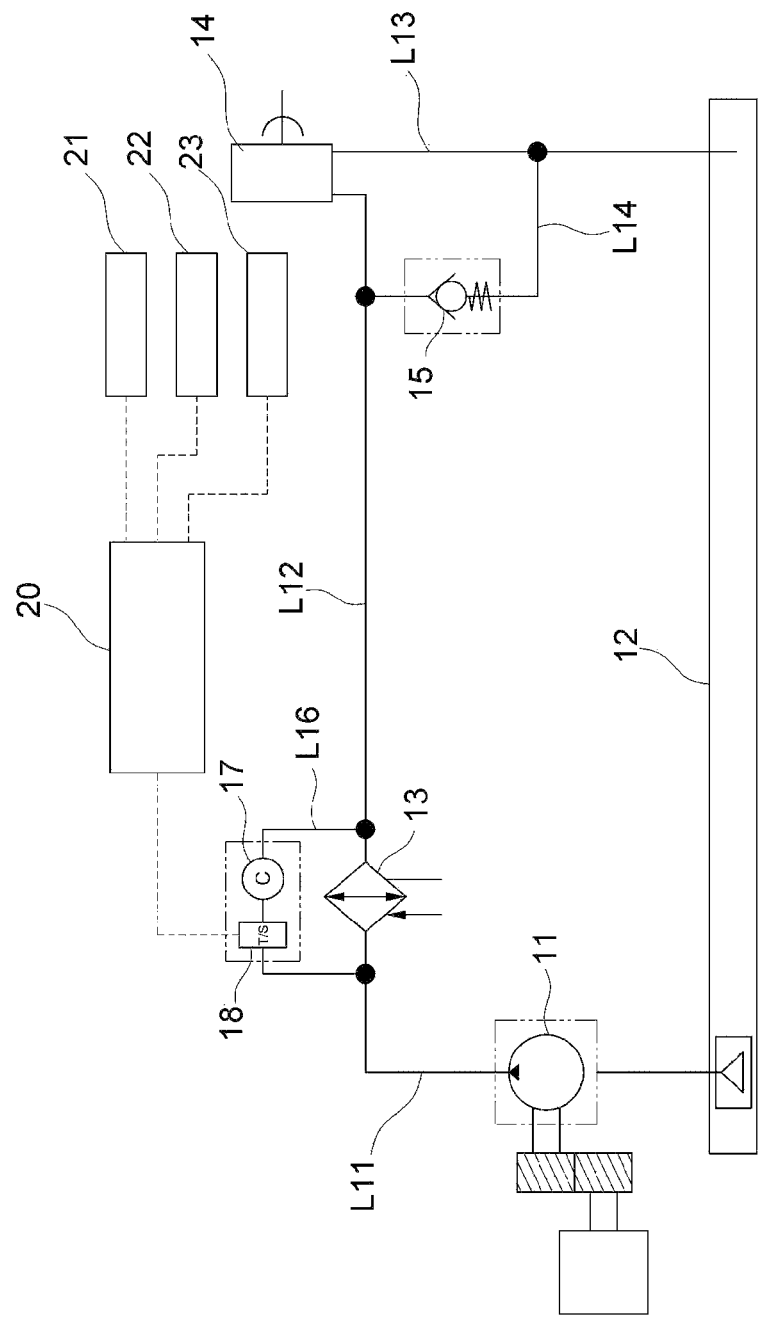
FIG. 3 is a hydraulic circuit diagram for describing a cooling device for a forklift brake system according to another exemplary embodiment of the present invention.

Hereinafter, a cooling device for a forklift brake system according to another exemplary embodiment of the present invention will be described with reference to FIG. 3. FIG. 3 is a hydraulic circuit diagram for describing a cooling device for a forklift brake system according to another exemplary embodiment of the present invention.

The cooling device for the forklift brake system according to another exemplary embodiment of the present invention includes a hydraulic pump 11, an oil tank 12, a cooler 13, and a service brake 14.

The hydraulic pump 11 and the cooler 13 are connected through a first hydraulic line L11. The cooler 13 and the service brake 14 are connected through a second hydraulic line L12. Further, the service brake 14 and the oil tank 12 are connected through a third hydraulic line L13.

In the meantime, a first bypass line L14 is connected so as to connect a front end and a rear end of the service brake 14, and a check valve 15 is provided at the first bypass line L14.

Particularly, a point, at which the first bypass line L14 is connected with the second hydraulic line L12, is much closer to the service brake 14, than the cooler 13.

Further, a third bypass line L16 may be connected from a front end of the cooler 13 to a rear end of the cooler 13. A thermostat valve 17 is provided at the third bypass line L16. When a temperature of cooling oil reaches a setting temperature, the thermostat valve 17 is opened.

For example, the setting temperature may be set by 30° C. of a temperature of cooling oil. Accordingly, when a temperature of the cooling oil is higher than the setting temperature, the thermostat valve 17 is maintained in a closed state and the cooling oil passes through the cooler 13. When the temperature of the cooling oil is lower than the setting temperature, the thermostat valve 17 is opened and the cooling oil bypasses the cooler 13. Accordingly, it is possible to prevent the cooler 13 from being damaged.

In the meantime, a temperature sensor 18 may be further provided at a front end of the thermostat valve 17. The temperature sensor 18 detects a temperature of the cooling oil, and the detected temperature value is provided to a controller 20.

In the meantime, there may be a case where the thermostat valve 17 is damaged due to an unknown reason. In this case, whether a current temperature of the cooling oil is within an allowable temperature range may be recognized by the temperature sensor 18. When the temperature of the cooling oil deviates from the allowable temperature range and is an abnormally high temperature, for example, 120° C. or higher, it is determined that abnormality is generated in the thermostat valve 17.

That is, the controller 20 determines a current temperature of the cooling oil, and when the current temperature of the cooling oil deviates from the allowable temperature range, the controller 20 displays the abnormal temperature on a dashboard 21, and enables a driver to know that there is abnormality in the temperature of the cooling oil. Accordingly, the driver may recognize that there is a problem in the cooling system and take measures.

Further, the controller 20 determines a current temperature of the cooling oil, and when the current temperature of the cooling oil deviates from the allowable temperature range, the controller 20 may generate a warning sound through a buzzer 22 and call attention of the driver, and thus the driver may recognize that there is abnormality in the temperature of the cooling oil. Further, the driver may recognize that there is a problem in the cooling system and take measures.

Further, the controller 20 determines a current temperature of the cooling oil, and when the current temperature of the cooling oil deviates from the allowable temperature range, the controller 20 may provide a transmission controller 23 with temperature information. The situation where the current temperature of the cooling oil deviates from the allowable temperature range may be understood as a situation where the service brake 14 may not be normally cooled. In response to the situation, the transmission controller 23 controls a speed of a vehicle to be decreased, thereby enabling the forklift to stably travel.

Third Exemplary Embodiment

Figure 4:
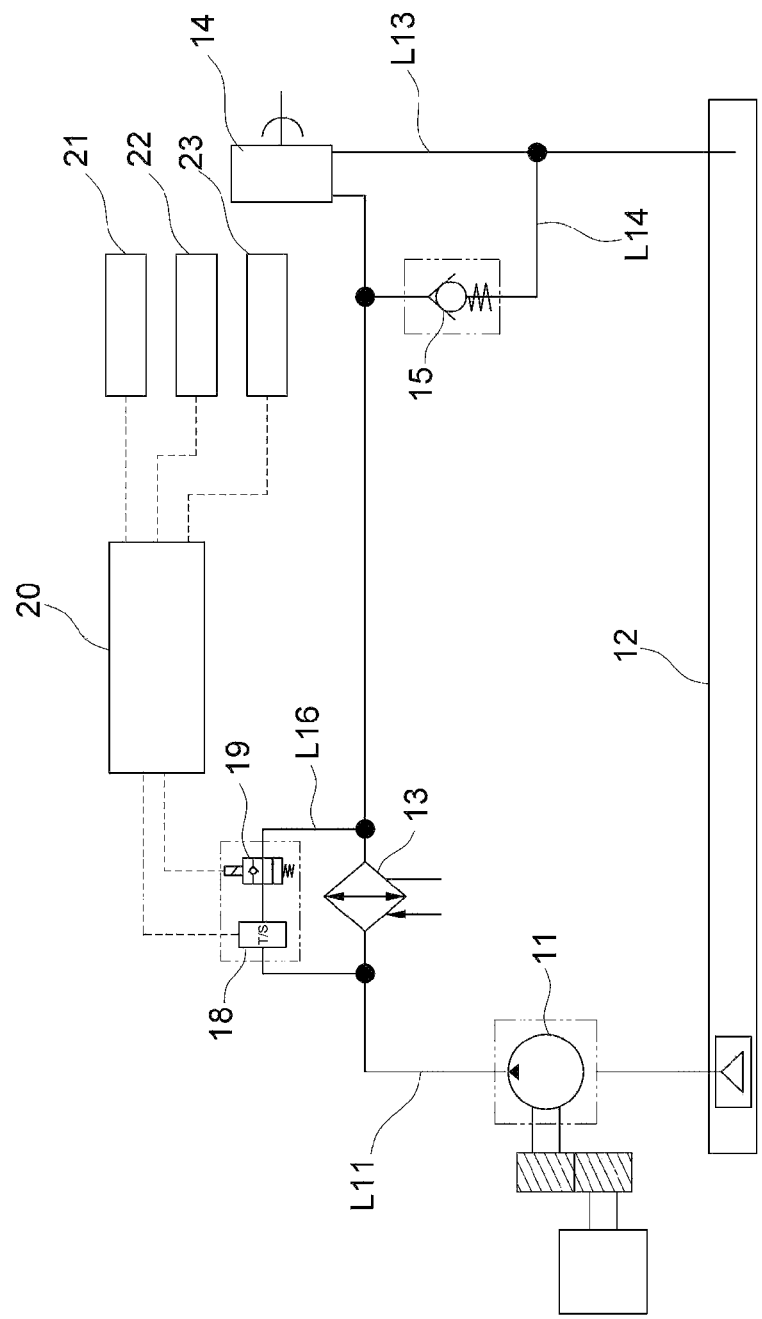
FIG. 4 is a hydraulic circuit diagram for describing a cooling device for a forklift brake system according to still another exemplary embodiment of the present invention.

Hereinafter, a cooling device for a forklift brake system according to still another exemplary embodiment of the present invention will be described with reference to FIG. 4. FIG. 4 is a hydraulic circuit diagram for describing a cooling device for a forklift brake system according to still another exemplary embodiment of the present invention.

The cooling device for the forklift brake system according to still another exemplary embodiment of the present invention includes a hydraulic pump 11, an oil tank 12, a cooler 13, and a service brake 14.

The hydraulic pump 11 and the cooler 13 are connected through a first hydraulic line L11. The cooler 13 and the service brake 14 are connected through a second hydraulic line L12. Further, the service brake 14 and the oil tank 12 are connected through a third hydraulic line L13.

In the meantime, a first bypass line L14 is connected so as to connect a front end and a rear end of the service brake 14, and a check valve 15 is provided at the first bypass line L14.

Particularly, a point, at which the first bypass line L14 is connected with the second hydraulic line L12, is much closer to the service brake 14, than the cooler 13.

Further, a third bypass line L16 is connected from a front end of the cooler 13 to a rear end of the cooler 13. A hydraulic valve 19 is provided at the third bypass line L16. The hydraulic valve 19 is opened and closed according to a pilot signal.

In the meantime, a temperature sensor 18 may be further provided at a front end of the thermostat valve 17. The temperature sensor 18 detects a temperature of the cooling oil, and the detected temperature value is provided to a controller 20.

The controller 20 generates a pilot signal according to a temperature value of the cooling oil and provides the hydraulic valve 19 with the pilot signal.

For example, the setting temperature may be set by 30° C. of a temperature of cooling oil. Accordingly, when the temperature of the cooling oil is higher than the setting temperature, the hydraulic valve 19 is maintained in a closed state, so that the cooling oil passes through the cooler 13. When the temperature of the cooling oil is lower than the setting temperature, the controller 20 generates a pilot signal so as to allow the hydraulic valve 19 to be opened. When the hydraulic valve 19 receives the pilot signal directing the opening, the hydraulic valve 19 is opened and the cooling oil bypasses the cooler 13. Accordingly, it is possible to prevent the cooler 13 from being damaged.

In the meantime, there may be a case where the hydraulic valve 19 is damaged due to an unknown reason. In this case, whether a current temperature of the cooling oil is within an allowable temperature range may be recognized by the temperature sensor 18. When the temperature of the cooling oil deviates from the allowable temperature range and is an abnormally high temperature, for example, 120° C. or higher, it is determined that the hydraulic valve 19 is in an abnormal state.

That is, the controller 20 determines a current temperature of the cooling oil, and when the current temperature of the cooling oil deviates from the allowable temperature range, the controller 20 displays the abnormal temperature on a dashboard 21, and enables a driver to know that there is abnormality in the temperature of the cooling oil. Accordingly, the driver may recognize that there is a problem in the cooling system and take measures.

Further, the controller 20 determines a current temperature of the cooling oil, and when the current temperature of the cooling oil deviates from the allowable temperature range, the controller 20 may generate a warning sound through a buzzer 22 and call attention to the driver, and thus the driver may recognize that there is abnormality in the temperature of the cooling oil. Further, the driver may recognize that there is a problem in the cooling system and take measures.

Further, the controller 20 determines a current temperature of the cooling oil, and when the current temperature of the cooling oil deviates from the allowable temperature range, the controller 20 may provide a transmission controller 23 with temperature information. The situation where the current temperature of the cooling oil deviates from the allowable temperature range may be understood as a situation where the service brake 14 may not be normally cooled. In response to the situation, the transmission controller 23 controls a speed of a vehicle to be decreased, thereby enabling the forklift to stably travel.

The exemplary embodiments of the present invention have been described with reference to the accompanying drawings, but those skilled in the art may understand that the present invention may be carried out in another specific form without changing the technical spirit or an essential feature thereof.

Accordingly, it will be understood that the aforementioned exemplary embodiments are described for being illustrative in all aspects and are not limited, and the scope of the present invention shall be represented by the claims to be described below, and all of the changes or modified forms induced from the meaning and the scope of the claims, and an equivalent concept thereof are included in the scope of the present invention.

INDUSTRIAL APPLICABILITY

The cooling device for the forklift brake system according to the exemplary embodiment of the present invention may be used for preventing a cooler from being damaged by an abnormal pressure of cooling oil.

DESCRIPTION OF MAIN REFERENCE NUMERALS OF DRAWINGS

| | |
|---|---|
| 1, 11: Hydraulic pump | 2, 12: Oil pump |
| 3, 13: Cooler | 4, 14: Service brake |
| 5, 15: Check valve | 16: Relief valve |
| 17: Thermostat valve | 18: Temperature sensor |
| 19: Hydraulic valve | 20: Controller |
| 21: Dashboard | 22: Buzzer |
| 23: Transmission controller | L1~L3: First to third hydraulic lines |
| L11~L13: First to third hydraulic lines | |
| L4: Bypass line | L14~L16: First to third bypass lines |

The invention claimed is:

1. A cooling device for a forklift brake system, the cooling device comprising:
   an oil tank in which cooling oil is stored;
   a hydraulic pump which sucks and discharges the cooling oil;
   a cooler which cools the discharged cooling oil;
   a service brake which is cooled by the cooled cooling oil and allows the used cooling oil to be returned to the oil tank;
   a first bypass line which connects a front end of the service brake and a rear end of the service brake;
   a check valve which is installed on the first bypass line, and is opened when an abnormal pressure is generated at the front end of the service brake and allows the cooled cooling oil to bypass the service brake;

a third bypass line which connects a front end of the cooler and a rear end of the cooler;
a thermostat valve which is installed on the third bypass line, and is maintained in a closed state when a temperature of the cooling oil discharged from the hydraulic pump is higher than a setting temperature and is opened when the temperature of the cooling oil discharged from the hydraulic pump is lower than the setting temperature to allow the cooling oil to bypass the cooler;
a temperature sensor which detects a temperature of the cooling oil at a front end of the thermostat valve; and
a controller which is configured to receive the temperature value of the cooling oil detected by the temperature sensor, and control a dashboard to display an abnormal temperature when the received temperature value deviates from an allowable temperature range.

2. The cooling device of claim 1, further comprising:
a second bypass line which is connected from a front end of the cooler 13 to the oil tank; and
a relief valve which is installed on the second bypass line and is set with a pressure allowable by the cooler.

3. The cooling device of claim 1,
wherein the controller is configured to receive the temperature value of the cooling oil detected by the temperature sensor, and to control a buzzer to output a warning sound when the received temperature value deviates from an allowable temperature range.

4. The cooling device of claim 1,
wherein the controller is configured to receive the temperature value of the cooling oil detected by the temperature sensor, and to control a transmission controller to decrease a speed of a vehicle when the received temperature value deviates from an allowable temperature range.

5. A cooling device for a forklift brake system, the cooling device comprising:
an oil tank in which cooling oil is stored;
a hydraulic pump which sucks and discharges the cooling oil;
a cooler which cools the discharged cooling oil;
a service brake which is cooled by the cooled cooling oil and allows the used cooling oil to be returned to the oil tank;
a first bypass line which connects a front end of the service brake and a rear end of the service brake;
a check valve which is installed on the first bypass line, and is opened when an abnormal pressure is generated at the front end of the service brake and allows the cooled cooling oil to bypass the service brake;
a third bypass line which connects a front end of the cooler and a rear end of the cooler;
a hydraulic valve which is installed on the third bypass line and is opened and closed;
a temperature sensor which detects a temperature of the cooling oil at a front end of the hydraulic valve; and
a controller which is configured to receive the temperature value of the cooling oil detected by the temperature sensor, and to control the hydraulic valve to be maintained in a closed state when the temperature value is higher than a setting temperature and controls the hydraulic valve to be opened when the temperature value is lower than the setting temperature.

6. The cooling device of claim 5, wherein when the temperature value of the cooling oil deviates from an allowable temperature range, the controller controls a dashboard to display an abnormal temperature.

7. The cooling device of claim 5, wherein when the temperature value of the cooling oil deviates from an allowable temperature range, the controller controls a buzzer to output a warning sound.

8. The cooling device of claim 5, wherein when the temperature value of the cooling oil deviates from an allowable temperature range, the controller controls the transmission controller to decrease a speed of a vehicle.

* * * * *